United States Patent
Ma et al.

(10) Patent No.: US 12,482,191 B2
(45) Date of Patent: Nov. 25, 2025

(54) PARALLEL RENDERERS FOR ELECTRONIC DEVICES

(71) Applicant: Apple Inc., Cupertino, CA (US)

(72) Inventors: Mark L. Ma, San Francisco, CA (US); Pierre D'Herbemont, San Francisco, CA (US); Pau Sastre Miguel, San Francisco, CA (US); Rebecca F. Holt, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 17/900,831

(22) Filed: Aug. 31, 2022

(65) Prior Publication Data
US 2023/0102820 A1    Mar. 30, 2023

Related U.S. Application Data

(60) Provisional application No. 63/248,410, filed on Sep. 24, 2021.

(51) Int. Cl.
  *G06T 19/00* (2011.01)
  *G06F 3/01* (2006.01)
  *G06T 15/00* (2011.01)

(52) U.S. Cl.
  CPC ............ *G06T 19/006* (2013.01); *G06F 3/017* (2013.01); *G06T 15/005* (2013.01)

(58) Field of Classification Search
  CPC ...... G06T 19/006; G06T 15/005; G06F 3/017
  See application file for complete search history.

(56) References Cited

U.S. PATENT DOCUMENTS

| | | | |
|---|---|---|---|
| 10,706,212 | B1 | 7/2020 | Righetto et al. |
| 2011/0145879 | A1* | 6/2011 | Rajamani ............. G06F 3/1454 |
| | | | 725/116 |
| 2016/0283081 | A1 | 9/2016 | Johnston et al. |
| 2018/0330515 | A1 | 11/2018 | Stall |
| 2019/0371262 | A1 | 12/2019 | Koo et al. |
| 2020/0065361 | A1 | 2/2020 | Lewbel |
| 2020/0234487 | A1* | 7/2020 | Clapp ................. G02B 27/017 |
| 2021/0065436 | A1 | 3/2021 | Oriol et al. |
| 2021/0074072 | A1 | 3/2021 | Desai et al. |
| 2021/0185294 | A1 | 6/2021 | Malaika |
| 2021/0287453 | A1* | 9/2021 | Chapman ............ G06F 3/04817 |

OTHER PUBLICATIONS

International Search Report and Written Opinion from PCT/US2022/043396, dated Dec. 9, 2022, 11 pages.
Korean Patent Application No. 10-2024-7009450; Office Action dated Jul. 17, 2025, 14 pages with English language translation.

* cited by examiner

*Primary Examiner* — Sing-Wai Wu
(74) *Attorney, Agent, or Firm* — BAKERHOSTETLER

(57) ABSTRACT

Aspects of the subject technology relate to electronic devices having multiple renderers. The multiple renderers may include a system renderer that renders system content and application content generated by some applications at the electronic device, and one or more application renderers that render application content generated by one or more other corresponding applications. The electronic device may include a compositor that receives rendered content from the system renderer and one or more application renderers, and generates a composite display environment that concurrently includes the rendered content from the system renderer and one or more application renderers.

32 Claims, 7 Drawing Sheets

PARALLEL RENDERERS FOR ELECTRONIC DEVICES

CROSS REFERENCE TO RELATED APPLICATIONS

This application claims the benefit of priority to U.S. Provisional Patent Application No. 63/248,410, entitled, "Parallel Renderers for Electronic Devices", filed on Sep. 24, 2021, the disclosure of which is hereby incorporated herein in its entirety.

TECHNICAL FIELD

The present description relates generally to electronic devices, including, for example, parallel renderers for electronic devices.

BACKGROUND

Electronic devices often include multiple applications that generate content to be displayed using a display of the electronic device.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
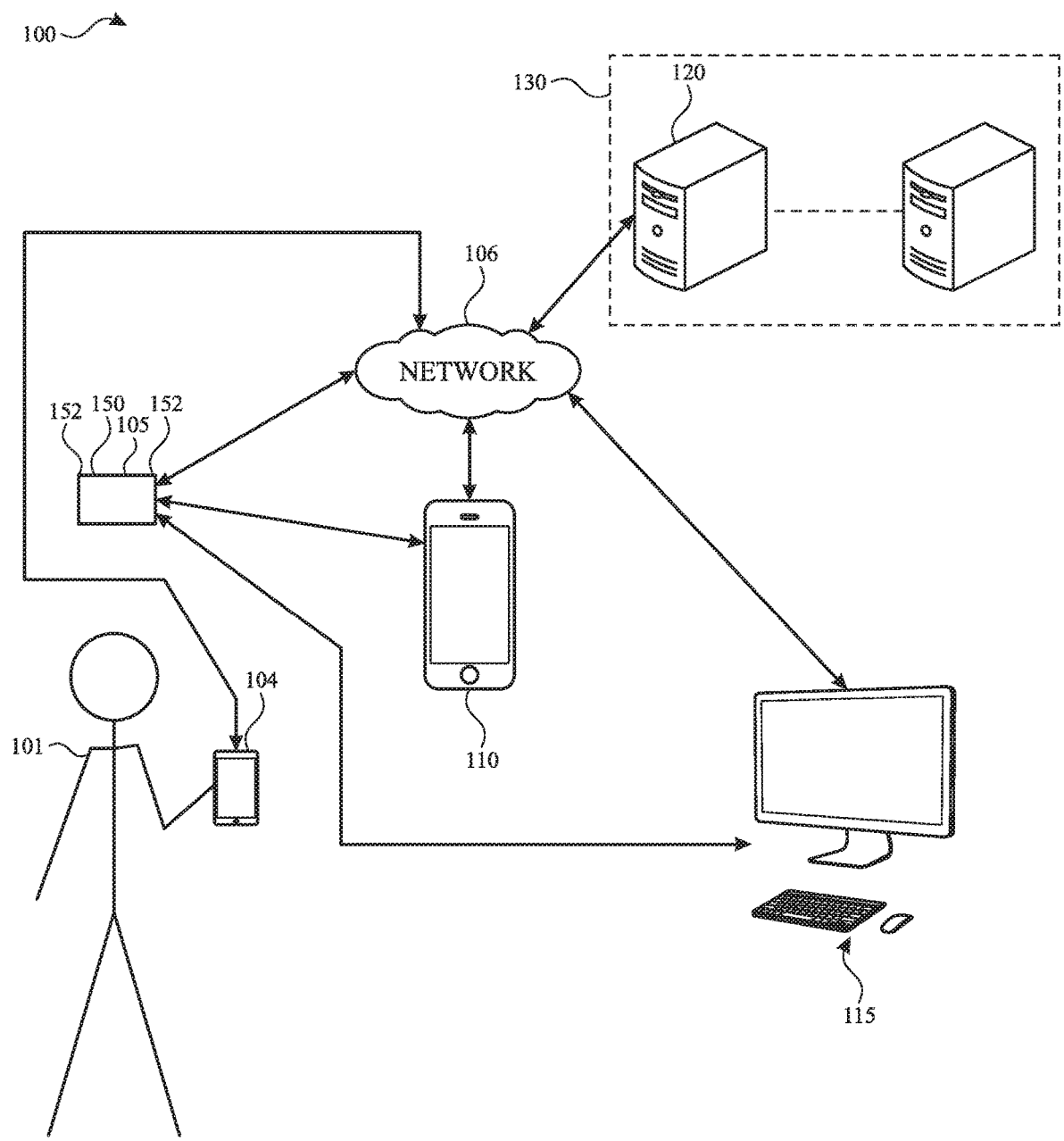
FIG. 1 illustrates an example system architecture including various electronic devices that may implement the subject system in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide a device that can concurrently display different rendered content items that have been generated, in parallel, by two or more renderers at the device. The renderers may include one or more application renderers that are each provided as part of a corresponding application, and which may render content generated by the corresponding application, for display. The renderers may also include a system renderer that renders content (e.g., including notifications) generated by system processes at the device and/or application-generated content provided to the system renderer by one or more other applications running at the device.

In one or more implementations, rendered content from the system renderer and rendered content from the application renderer(s) can be provided to a compositor at the device that integrates the rendered content from the multiple renderers to form composite rendered frames for display. The compositor can also throttle and/or prioritize the rendered content from various ones of the multiple renderers in various operational scenarios. In one or more implementations, user input, such as gaze information, can be provided to one or more application renderers. The compositor may allow a user to zoom or portal into one or the other of multiple concurrently displayed renderings from the multiple renderers.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, an electronic device 110, an electronic device 115, and a server 120. For explanatory purposes, the system architecture 100 is illustrated in FIG. 1 as including the electronic device 105, the electronic device 110, the electronic device 115, and the server 120; however, the system architecture 100 may include any number of electronic devices and any number of servers or a data center including multiple servers.

The electronic device 105 may be smart phone, a tablet device, or a wearable device such as a head mountable portable system, that includes a display system capable of presenting a visualization of an extended reality environment to a user 101. The electronic device 105 may be powered with a battery and/or any other power supply. In an example, the display system of the electronic device 105 provides a stereoscopic presentation of the extended reality environment, enabling a three-dimensional visual display of a rendering of a particular scene, to the user. In one or more implementations, instead of, or in addition to, utilizing the electronic device 105 to access an extended reality environment, the user may use a handheld electronic device 104, such as a tablet, watch, mobile device, and the like.

The electronic device 105 may include one or more cameras such as camera(s) 150 (e.g., visible light cameras, infrared cameras, etc.) Further, the electronic device 105 may include various sensors 152 including, but not limited to, cameras, image sensors, touch sensors, microphones, inertial measurement units (IMU), heart rate sensors, temperature sensors, Lidar sensors, radar sensors, sonar sensors, GPS sensors, Wi-Fi sensors, near-field communications sensors, etc.) Moreover, the electronic device 105 may include hardware elements that can receive user input such as hardware buttons or switches. User input detected by such sensors and/or hardware elements correspond to various input modalities for initiating recording within a given extended reality environment. For example, such input modalities may include, but not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc. The electronic device 105 may also detect and/or classify physical objects in the physical environment of the electronic device 105.

The electronic device 105 may be communicatively coupled to a base device such as the electronic device 110 and/or the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power limitations of the electronic device 105 such as available battery power of the device. In response to power limitations, the electronic device 105 may deactivate certain sensors within the device itself to preserve battery power.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the extended reality environment may be offloaded to the base device thereby reducing processing burdens on the electronic device 105. For instance, in an implementation, the electronic device 105 works in conjunction with the electronic device 110 or the electronic device 115 to generate an extended reality environment including physical and/or virtual objects that enables different forms of interaction (e.g., visual, auditory, and/or physical or tactile interaction) between the user and the extended reality environment in a real-time manner. In an example, the electronic device 105 provides a rendering of a scene corresponding to the extended reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The electronic device 105 may also detect events that have occurred within the scene of the extended reality environment. Examples of such events include detecting a presence of a particular person, entity, or object in the scene. Detected physical objects may be classified by electronic device 105, electronic device 110, and/or electronic device 115 and the location, position, size, dimensions, shape, and/or other characteristics of the physical objects can be used to coordinate the rendering of virtual content, such as a UI of an application, for display within the XR environment.

The network 106 may communicatively (directly or indirectly) couple, for example, the electronic device 105, the electronic device 110 and/or the electronic device 115 with the server 120 and/or one or more electronic devices of one or more other users. In one or more implementations, the network 106 may be an interconnected network of devices that may include, or may be communicatively coupled to, the Internet.

The electronic device 110 may include a touchscreen and may be, for example, a smartphone that includes a touchscreen, a portable computing device such as a laptop computer that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in an extended reality environment. In one or more implementations, the electronic device 110 may include a touchpad. In FIG. 1, by way of example, the electronic device 110 is depicted as a mobile smartphone device with a touchscreen. In one or more implementations, the electronic device 110, the handheld electronic device 104, and/or the electronic device 105 may be, and/or may include all or part of, the electronic system discussed below with respect to FIG. 12. In one or more implementations, the electronic device 110 may be another device such as an Internet Protocol (IP) camera, a tablet, or a peripheral device such as an electronic stylus, etc.

The electronic device 115 may be, for example, desktop computer, a portable computing device such as a laptop computer, a smartphone, a peripheral device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 12.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for extended reality environments. In an implementation, the server 120 may function as a cloud storage server that stores any of the aforementioned extended reality content generated by the above-discussed devices and/or the server 120.

Figure 2:
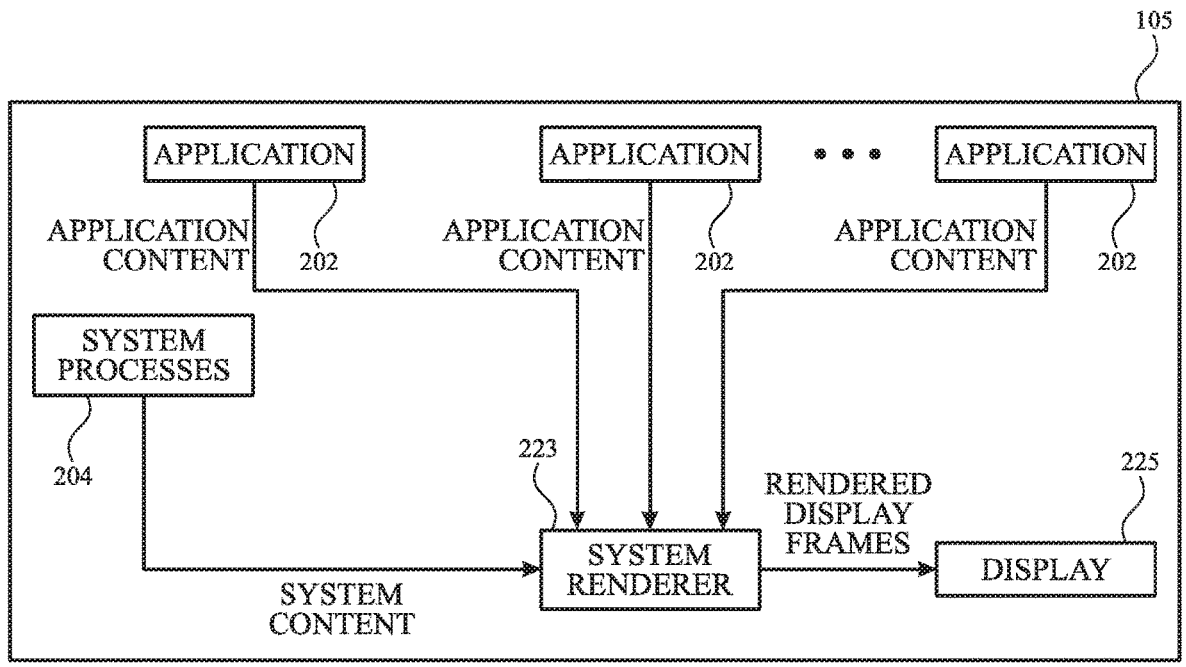
FIG. 2 illustrates example computing device that may implement aspects of the subject technology.

FIG. 2 illustrates an example architecture that may be implemented by the electronic device 105 in accordance with one or more implementations of the subject technology. For explanatory purposes, portions of the architecture of FIG. 2 is described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. In the example of FIG. 2, one or more applications such as applications 202 each provide application content to a system renderer 223 for rendering of the application content. As examples, the application content may be content, generated by the application 202, for a user interface (UI) of the application or other application-generated content, such as a virtual character or object. In one or more implementations in which the application content that is provided to the system renderer 223 corresponds to content for a UI, the application content may include application-generated content (e.g., windows, buttons, tools, etc.) and/or user-generated content (e.g., text, images, etc.), and information for rendering the content in the UI. For example, the information for rendering the content may include a layer tree that includes information indicating how and where the application content is to be rendered within the UI. For example, the application content may include one or more layer trees that describe (e.g., in hierarchical form) how one or more images, video streams, text, and/or state information associated with elements of the UI can be combined to form display frames that include the UI. As shown in the example of FIG. 2, a system renderer 223 renders the application content from all applications 202, for display by a display such as display 225 of the electronic device 105.

As shown in FIG. 2, system content may also be generated and/or provided by one or more system processes, such as system process 204, to the system renderer 223, for rendering. System process 204 may be, as an example, an operating system process of the electronic device 105. The system content may include content (e.g., text, images, layer trees, etc.) for representing system features, such as menu features, or images or text representing application icons, files, folders, or utilities that are provided by the operating system of the electronic device 105. In one or more implementations, the system content may include one or more notifications for display alongside and/or within the rendered application content. In one or more implementations, the system content may include one or more images (e.g., images of a video stream) captured by one or more cameras of the electronic device 105. System renderer 223 may render the system content and/or any application content from application(s) 202, to form rendered display frames for display by display 225. The display 225 may display the rendered display frames, to generate a display environment for viewing by the user. The rendered display frames may be, for example, two-dimensional arrays of image pixel values or a stream of data representing a two-dimensional array of image pixel values, in some implementations. The display frames that form the display environment may be overlaid on a view of a portion of a physical environment, or may be displayed so as to block a view of the physical environment.

In the example of FIG. 2, all of the application content and the system content is rendered into display frames by the system renderer 223. However, it can also be desirable to allow one or more applications at the electronic device to perform custom renderings. In order, for example, to allow the electronic device 105 (or another electronic device or system) to incorporate application-rendered content into a display environment (e.g., including application content and/or system content rendered by the system renderer 223), the electronic device 105 may be provided with parallel renderers, and a compositor.

Figure 3:
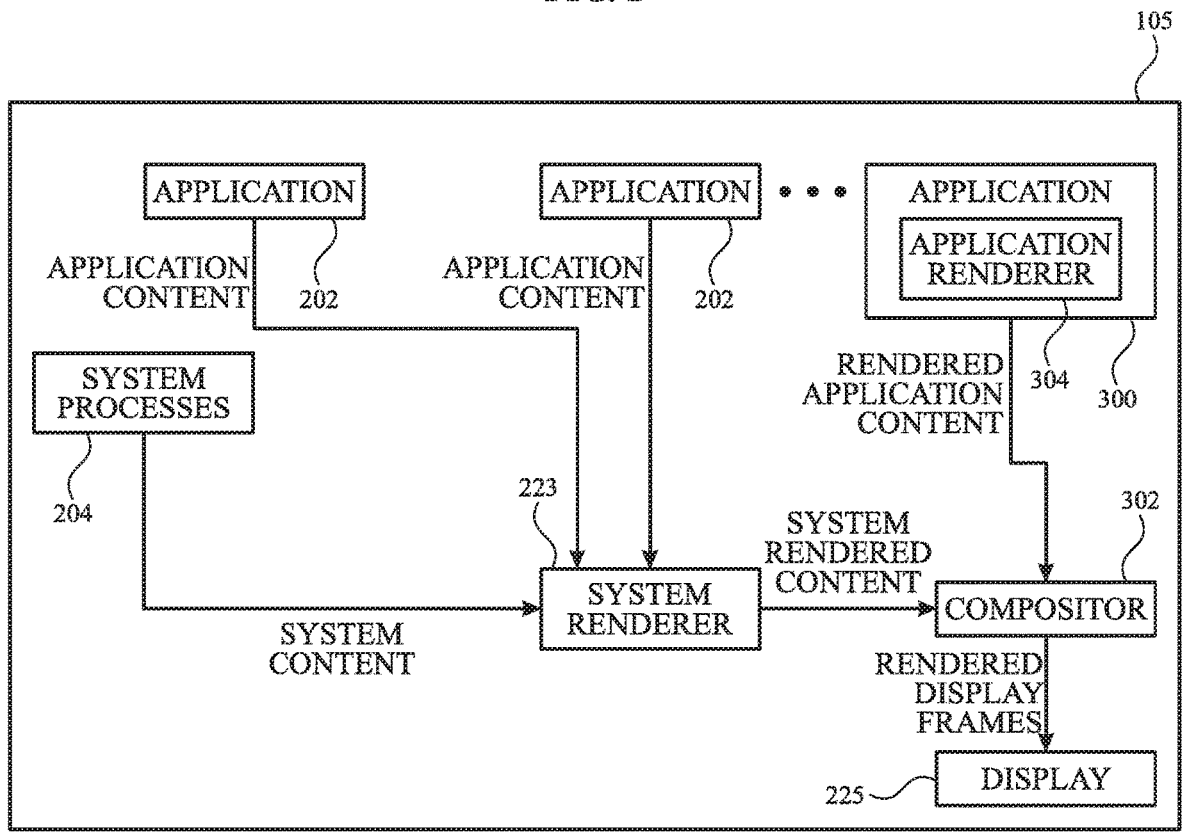
FIG. 3 illustrates another example of a computing device that may implement aspects of the subject technology.

FIG. 3 illustrates an example architecture having parallel renderers and a compositor, that may be implemented by the electronic device 105 in accordance with one or more implementations of the subject technology. For explanatory purposes, portions of the architecture of FIG. 3 is described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 3 can be implemented in software or hardware, including by one or more processors and a memory device containing instructions, which when executed by the processor cause the processor to perform the operations described herein. In the example of FIG. 3, an application 300 at the electronic device includes an application renderer 304 that allows the application 300 to render its own (e.g., application-generated and/or user-generated) content.

As shown in FIG. 3, one or more applications 202 and/or the system process 204 may provide application content and/or system content, respectively, to the system renderer 223, as in the example of FIG. 2. However, in the implementation illustrated in FIG. 3, the application 300 includes its own application renderer 304 to render the application content for that application 300, and provides rendered application content, for the application 300, to a compositor 302. As shown, the compositor 302 also receives the system rendered content (e.g., including rendered application content for application(s) 202 and/or rendered system content for system process 204) from the system renderer 223.

Compositor 302 may then combine the system rendered content and the rendered application content to form rendered display frames. Compositor 302 may generate rendered display frames that include the rendered application content from the application renderer 304 at a first location in the rendered display frames and the system rendered content at a second location in the rendered display frames.

Compositor 302 may determine locations, sizes, resolutions, frame rates, and/or other display characteristics for each of the system rendered content and the rendered application content, based on an available display area, based on the locations, sizes, etc. of other display content received by the compositor, based on preferences received with the system rendered content and the rendered application content, based on system preferences, and/or based on user characteristics and/or actions. In one or more implementations, the compositor 302 may modify the frame rate and/or resolution of one or the other of the system rendered content and the rendered application content that is included in the rendered display frames, such as based on user characteristics such as a user touch, a user gesture, a user orientation, or a user gaze. In one or more implementations, the compositor 302 may modify the relative sizes and/or the locations of the system rendered content and/or the rendered application content that is included in the rendered display frames based on user characteristics such as a user touch, a user gesture, a user orientation, or a user gaze.

As shown, compositor 302 may provide the rendered display frames to display 225. Display 225 may then display the rendered display frames to generate a display environment in which the rendered application content from the application renderer 304 appears at a first location and the system rendered content appears at a second location, for viewing by a user.

Figure 4:
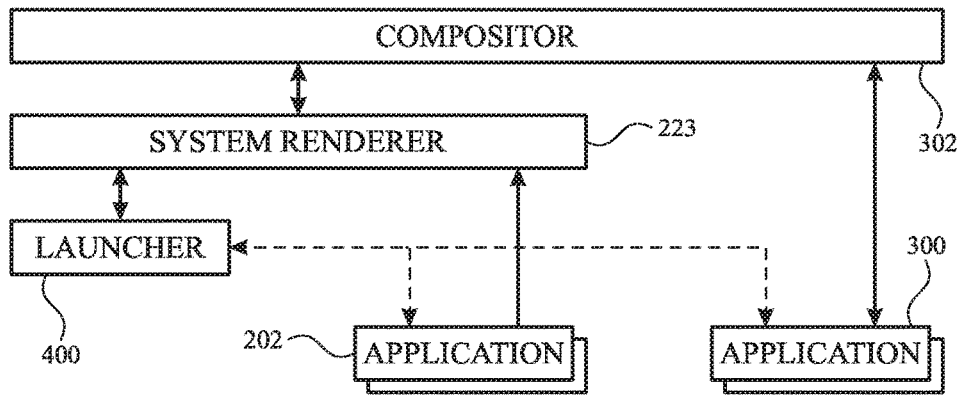
FIG. 4 illustrates a schematic diagram of exemplary logical components of a computing device that may implement aspects of the subject technology.

In one or more implementations, the electronic device 105 (or another electronic device implementing parallel renderers) may include a system launcher that launches applications and/or system processes for the electronic device. FIG. 4 illustrates an example architecture that may be implemented in an electronic device, and that includes a system launcher and parallel renderers.

As shown in the example of FIG. 4, a system launcher, such as launcher 400 may launch the application(s) 202, the application 300, and/or the system renderer 223 of an electronic device. In one or more implementations, the launcher 400 may, as part of the process of launching of the application 300, authorize the application 300 to access the compositor 302. For example, the launcher 400 may, as part of the process of launching of the application 300, provide the application 300 with access information for accessing the compositor 302. In one or more implementations, the application 300 may provide the access information to the compositor along with rendered application content for display, to indicate to the compositor 302 that the application 300 is authorized to generate application-rendered content for display (e.g., composited with system rendered content). In this way, applications that attempt to launch separately from the system launcher may be prevented from displaying application-rendered content, and may be required to instead to send application content to the system renderer 223 for rendering, in one or more implementations.

In one or more implementations, rendered application content from the application 300 may be a first three-dimensional rendering, the system rendered content may be a second three-dimensional rendering, and the compositor 302 may generate a display environment by generating a three-dimensional display environment that concurrently includes the first three-dimensional rendering at a first three-dimensional location in the three-dimensional display environment and the second three-dimensional rendering at a second three-dimensional location in the three-dimensional display environment.

Figure 5:
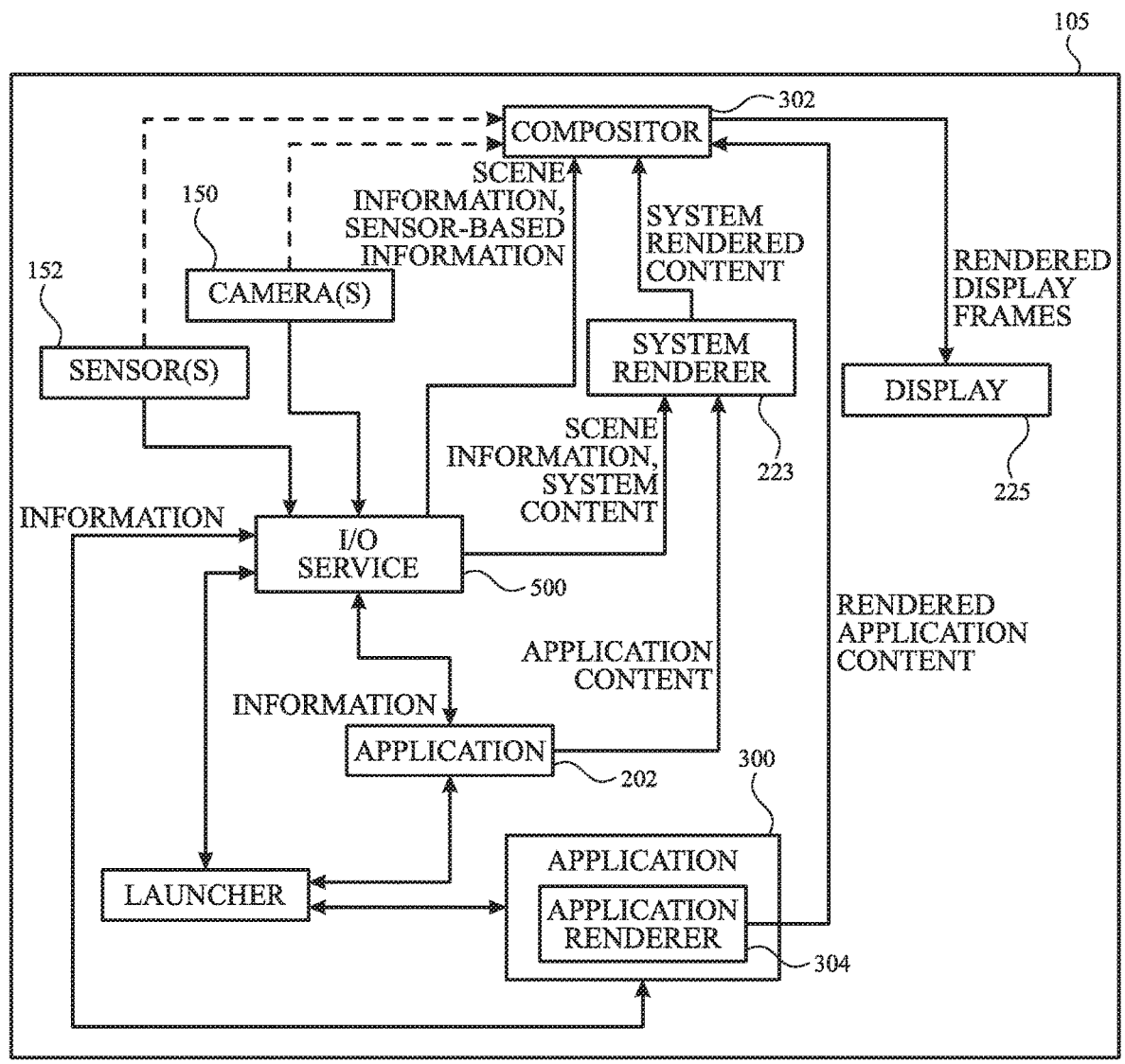
FIG. 5 illustrates another example of a computing device that may implement aspects of the subject technology.

FIG. 5 illustrates an example architecture, having parallel renderers and a compositor and configured for generating a three-dimensional display environment, that may be implemented by the electronic device 105 in accordance with one or more implementations of the subject technology. For explanatory purposes, portions of the architecture of FIG. 5 is described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 5 can be implemented in software or hardware, including by one or more processors and a memory device containing instructions, which when executed by the processor cause the processor to perform the operations described herein. In the example of FIG. 5, the electronic device 105 includes the system renderer 223 and an application 300 having an application renderer 304, and also includes an I/O service 500 (e.g., an XR service) that receives sensor data from sensor(s) 152 and/or image data from camera(s) 150. In this example, the I/O service 500 may encompass all or a part of the system process 204 of FIGS. 2 and/or 3.

In one or more implementations, sensors 152 provide environment information (e.g., depth information from one or more depth sensors) to the I/O service 500. Camera(s) 150 may also provide images of a physical environment to I/O service 500. I/O service 500 may generate three-dimensional scene information, such as a three-dimensional map, of some or all of the physical environment of electronic device 105 using the environment information (e.g., the depth information and/or the images) from sensors 152 and camera(s) 150.

As illustrated in FIG. 3, application 202 and/or application 300 may request and/or receive XR information from the I/O service 500. For example, the XR information may include identifiers of physical objects detected by the I/O service 500 that may be used by the application 202 for generating layer trees and/or other information that can be provided to the system renderer 223 for rendering application content from the application 202. In one or more implementations, the application 300 may use the XR information for rendering application content with the application renderer.

In one or more implementations, application 202 and/or application 300 may be, as examples, a gaming application, a media player application, a content-editor application, a training application, a simulator application, or generally any application that provides a UI and/or other application content for display at a location that depends on the physical environment, such as by anchoring the UI to a physical object.

In one or more implementations, once the application content has been generated by the application 202, the application content can be provided to the system renderer 223. As shown, scene information (e.g., a depth map of the physical environment, and/or object information for detected objects in the physical environment), can also be provided to system renderer 223 from the I/O service. System renderer 223 can then render the application content from application 202 for display by display 225 of electronic device 105 (e.g., using the scene information provided by the I/O service 500). For example, system renderer 223 may use the scene information from the I/O service 500 to determine how to render one or more characteristics of the system rendered content, such as the relative sizes and/or locations of system content from system process 204 and application content from application 202 (e.g., relative to each other and/or relative to physical objects in the physical environment).

In one or more implementations, the application content may include a layer tree. The layer tree may provide a hierarchy of layers, a tree or graph structure (e.g., a view tree, and/or a scene graph), and/or any other declarative form of describing the application content. For example, a layer tree may include and/or may be associated with a hierarchy of layers that describes each layer of the application content for display. For example, the application content may include content in conjunction with a backdrop, which may utilize one or more blur layers and/or other filter layers. Thus, the tree may include a node and/or subtree that contains one or more attributes describing the blur layer, such as depth, size, placement, and the like. In one or more implementations, system renderer 223 may parse a layer tree to manage the rendering of portions of the application content, such as portions corresponding to individual elements of the application content (e.g., elements of a UI for the application 202). In one or more implementations, layers of a layer tree from the application 202 may be rendered by the system renderer 223 using scene information, such as depth information that can be translated to a z-coordinate (and/or z-plane) in a three-dimensional coordinate system.

As shown in the example of FIG. 5, scene information can also be provided from the I/O service 500 to the compositor 302, in one or more implementations. Compositor 302 may use the scene information for combining the system rendered content from the system renderer 223 with the rendered application content received directly from the application 300 (e.g., from the application renderer 304 of the application 300).

For example, compositor 302 may use the scene information from the I/O service 500 to determine one or more characteristics of the rendered display frames, such as the relative sizes and/or locations of the system rendered content from system renderer 223 and the rendered application content from application 300 (e.g., relative to each other and/or relative to physical objects in the physical environment).

As shown, compositor 302 may also receive sensor data from the sensor(s) 152 and/or camera data (e.g., image data) from the camera(s) 150. In the example of FIG. 5, the sensor data and/or the camera data is provided directly to the compositor 302. However, in one or more implementations, I/O service 500 can pass the sensor data and/or camera data to the compositor 302, and/or can the I/O service 500 can processes the sensor data and/or the camera data to generate scene information and/or other sensor-based information to provide to the compositor 302. For example, the other sensor-based information may include user information, such as user motion information and/or user position and/or orientation information. For example the user position and/or orientation information may include an orientation of at least a portion of the user's head. For example, the user position and/or orientation information may include an orientation of the user's head (e.g., information indication an elevation angle, an azimuth angle, and/or a tilt angle of the user's head), and/or an orientation of the user's gaze (e.g., including a gaze location in coordinates corresponding to the display 225 and/or the physical environment). The sensor-based information may also include user action information such as information indicating a motion of the user's body, head, eyes, hands (e.g., a hand gesture), etc.

Compositor 302 may use the scene information and/or other sensor-based information to combine the system rendered content and the rendered application content, to generate the rendered display frames that form a display environment when displayed by the display 225. For example, the compositor 302 may use the scene information and/or other sensor-based information to determine a size, a resolution, an orientation, a location, a frame rate, and/or other display characteristics of each of the system rendered content and the rendered application content in the rendered display frames.

For example, in one or more implementations, compositor 302 may modify the frame rate and/or the resolution of one or the other of the system rendered content or the rendered application content based on the orientation of the user's head or gaze. For example, the compositor 302 may output rendered display frames at an output frame rate, and may receive the system rendered content at one input frame rate and the rendered application content at another input frame rate. In one example, the electronic device 105 (e.g., I/O service 500) may determine that the user's gaze is located on a portion of the system rendered content. In this example, even though the application 300 continues to provide rendered application frames at the other input frame rate, the compositor 302 may update the portion of the rendered display frames that corresponds to the rendered application frames at a rate that is lower than the rate at which the rendered application frames are received (e.g., until the device determines that the user's gaze is located on or moving toward the portion of the rendered display frames corresponding to the rendered application frame, which may cause the compositor to increase the rate at which the portion of the rendered display frames that corresponds to the rendered application frames is updated).

In one or more implementations, the compositor 302 may combine the system rendered content and the rendered application content for display at respective appropriate locations on the display 225, to appear at respective three-dimensional locations in the three-dimensional display environment, using the scene information and/or other sensor-based information provided by I/O service 500. Display 225 may be, for example, an opaque display, and camera(s) 150 may be configured to provide a pass-through video feed to the opaque display. The system rendered content and the rendered application content may be rendered for display at respective locations on the display that correspond to respective displayed locations of physical objects in the pass-through video. Display 225 may be, as another example, a transparent or translucent display. The system rendered content and the rendered application content may be rendered for display at respective locations on the display corresponding to a direct view, through the transparent or translucent display, of respective locations in the physical environment. Although the example of FIG. 5 illustrates a system renderer 223 that is separate from I/O service 500, it should be appreciated that I/O service 500 and system renderer 223 may form a common service and/or that rendering operations for rendering system content and/or application content from application 202 for display can be performed by the I/O service 500).

Figure 6:
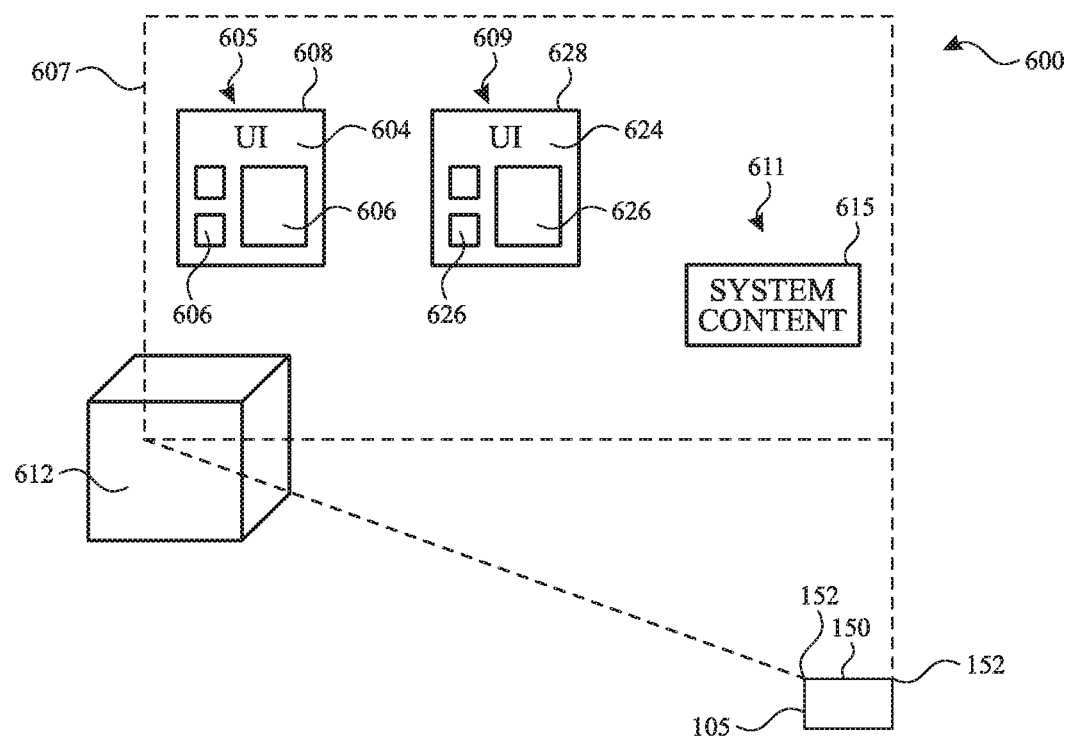
FIG. 6 illustrates an example of an environment of an electronic device in accordance with aspects of the subject technology.

FIG. 6 illustrates an example XR display environment in which application content from application 202 is rendered by system renderer 223 as a UI 604, and the rendered application content from application renderer 304 includes a UI 624 for the application 300. In the example of FIG. 6, system content 615 (e.g., from the system process 204) is displayed, along with the UI 604 and the UI 624, in a viewable area 607 of the display 225 of electronic device 105.

In the example of FIG. 6, a rendered display frame, generated by the compositor 302, fills the viewable area 607 of the display 225 and includes the user interface 604 (e.g., of application 202 and rendered by system renderer 223) displayed by electronic device 105 to appear at a first location 605 in an environment such as physical environment 600 of the electronic device 105 (e.g., a physical environment that includes one or more physical objects, such as physical object 612). As shown, compositor 302 has also included the user interface 624 (e.g., of application 300 and rendered by application 300) in the rendered display frame, such that the user interface 624 is displayed by electronic device 105 to appear at a second location 609 in the physical environment 600 of the electronic device 105. As shown, compositor 302 has also included the system content 615 (e.g., of system process 204 and rendered by system renderer 223) for display by electronic device 105 such that the system content 615 appears at a third location 611 in the physical environment 600 of the electronic device 105. In this example, the system content 615 is localized in a portion of the viewable area. However, in other examples, the system content 615 may include, for example, a background or a scene that provides a backdrop for the displayed UI 604 and UI 624.

In the example of FIG. 6, UI 604 includes a UI window 608, which may include one or more elements 606. Elements 606 may include (as examples) text entry fields, buttons, selectable tools, scrollbars, menus, drop-down menus, links, plugins, image viewers, characters, media players, sliders, or the like. Content corresponding to the elements 606 may have been provided from the application 202 to the system renderer 223, and rendered to form the UI window 608 by the system renderer. In the example of FIG. 6, UI 624 includes a UI window 628, which may include one or more elements 626. Elements 626 may include (as examples) text entry fields, buttons, selectable tools, scrollbars, menus, drop-down menus, links, plugins, image viewers, characters, media players, sliders, or the like. The application renderer 304 may have rendered the UI window 628 with the elements 626 as shown.

In the example of FIG. 6, the sizes, orientations, relative positions, resolutions, frame rates, and/or other display characteristics of the UI 604, the UI 624, and the system content 615 may be determined by the compositor 302, after the system rendered content (for system content 615 and UI 604) and the rendered application content (for UI 624) are received, respectively, from the system renderer 223 and the application renderer 304.

During operation, compositor 302 may also modify the sizes, orientations, relative positions, resolutions, frame rates, and/or other display characteristics of any or all of the UI 604, the UI 624, and/or the system content 615. For example, the compositor may modify any one of the UI 604, the UI 624, and/or the system content 615 based on sensor information such as the orientation of the user's head and/or gaze (e.g., to increase a frame rate or a resolution of the UI 604, the UI 624, or the system content 615 when the I/O service 500 determines that the user's gaze is currently located on a portion of the UI 604, the UI 624, or the system content 615).

Figure 7:
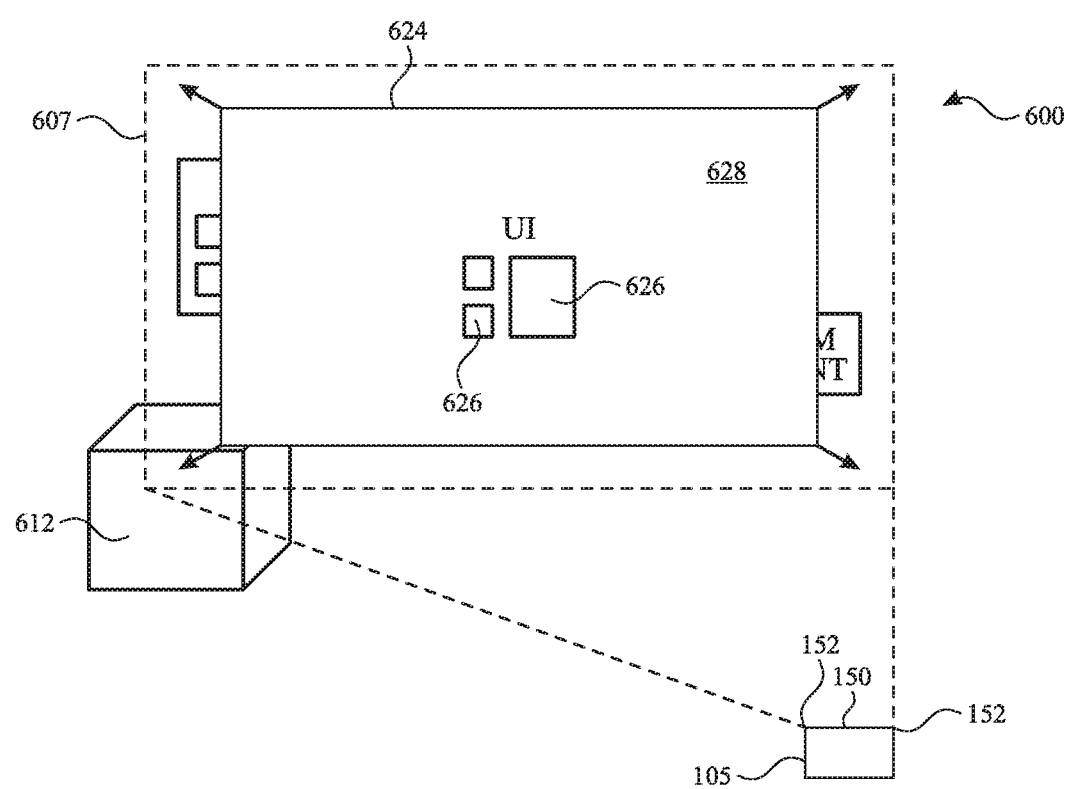
FIG. 7 illustrates a selection of displayed rendered content from various displayed rendered content in a display environment in accordance with aspects of the subject technology.

In one or more implementations, the compositor 302 may facilitate user interaction with the UI 604, the UI 624, or the system content 615. As one example, FIG. 7 illustrates an example use case in which the UI 624, as rendered by the application 300 and provided to the compositor 302, has been selected (e.g., by a user of the electronic device 105 from among the concurrently displayed UI 604, UI 624, and system content 615). For example, the UI 624 may have been selected by the user touching or clicking a location on the display 225 corresponding to the displayed UI 624, by the user making a hand gesture or other gesture (e.g., an eye gesture, such as the user resting their eyes on the displayed UI 624 or blinking while gazing at the displayed UI 624) associated with an apparent location of the displayed UI 624, or by the user provide a voice input to select the UI 624 (as examples).

In the example of FIG. 7, the compositor 302 causes an expansion of the selected UI 624. The expansion of the UI 624 may increase the size of the UI 624 to cover a larger portion of the viewable area 607 than previously occupied by the UI 624, and/or to encompass the entire viewable area 607 of the display 225. In this way, the compositor 302 can provide a user of the electronic device 105 to virtually portal into the UI 624 from the multi-UI display of FIG. 6. In another example, the compositor 302 can return to the multi-UI display of FIG. 6 (e.g., by reducing the size of the UI 624 and again including the UI 604 and/or the system content 615, and/or can expand the UI 604 upon a later selection of that UI. In this way, the compositor 302 can provide the electronic device 105 with the ability to portal into and out of application various UIs that are rendered by the system and/or rendered by the applications themselves.

Figure 8:
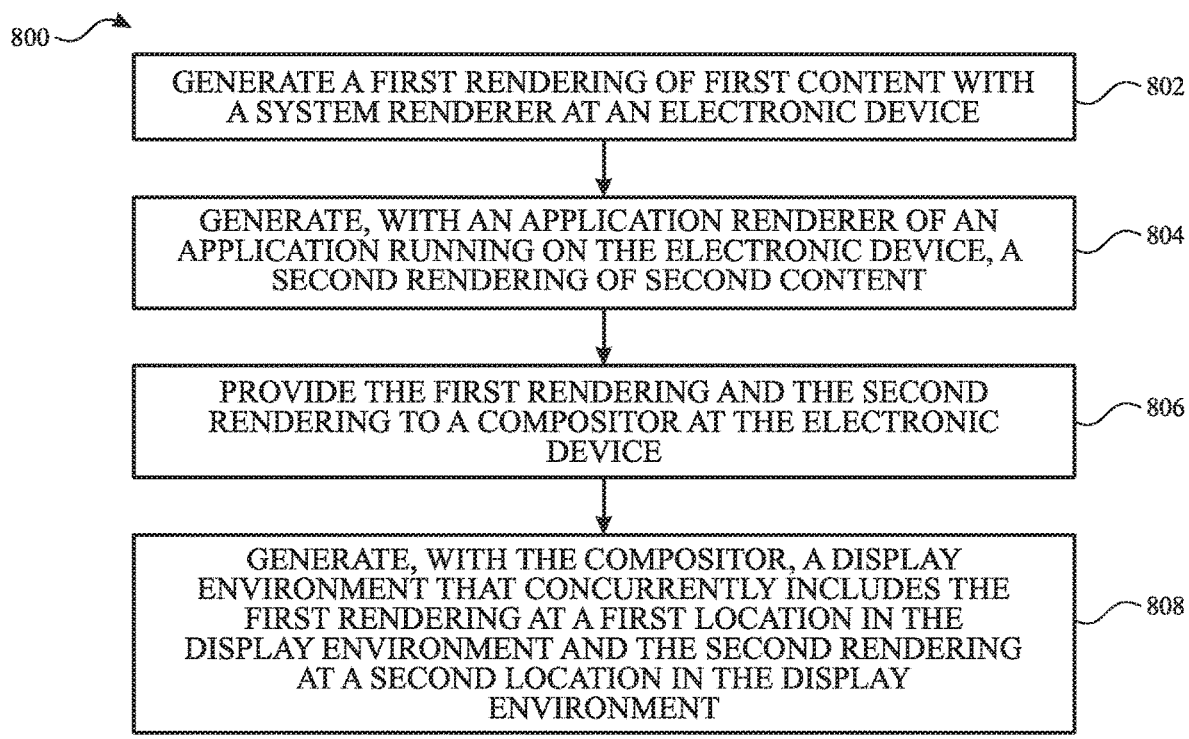
FIG. 8 illustrates a flow diagram of an example process for operating an electronic device having parallel renderers according to aspects of the subject technology.

FIG. 8 illustrates a flow diagram of an example process for operating an electronic device having parallel renderers according to aspects of the subject technology. The blocks of process 800 are described herein as occurring in serial, or linearly. However, multiple blocks of process 800 may occur in parallel. In addition, the blocks of process 800 need not be performed in the order shown and/or one or more blocks of process 800 need not be performed and/or can be replaced by other operations.

In the example of FIG. 8, at block 802, an electronic device (e.g., electronic device 105) may generate a first rendering of first content with a system renderer (e.g., system renderer 223). In one or more implementations, the first content may be provided from a first process at the electronic device to the system renderer at the electronic device. As an example, the first content may include content for a user interface (e.g., user interface 604) of an application, such as an application 202.

At block 804, the electronic device may generate, with an application renderer (e.g., application renderer 304) of an application (e.g., application 300) running on the electronic device, a second rendering of second content. In one or more implementations, the second content may be generated with the application. In one or more implementations, generating the second rendering of the second content may be performed, with the application renderer, concurrently with generating the first rendering of the first content with the system renderer. As an example, the second rendering may be a rendering of a user interface (e.g., user interface 624) of the application 300.

In various implementations, the first process may be a system process (e.g., system process 204) of the electronic device or may be another application (e.g., an application 202) running on the electronic device. For example, in one or more implementations, the application is a first application and the other application is a second application.

At block 806, the first rendering and the second rendering may be provided (e.g., from the system renderer and the application renderer) to a compositor (e.g., compositor 302) at the electronic device (e.g., as described herein in connection with FIGS. 3, 4, and/or 5). Providing the first rendering and the second rendering to the compositor may include providing the second rendering directly from the application to the compositor (e.g., without passing the second rendering to or from the system renderer).

At block 808, the compositor may generate a display environment that concurrently includes the first rendering at a first location in the display environment and the second rendering at a second location in the display environment. For example, the display environment may include a series of display frames that each include the first rendering and the second rendering, at respective positions in the display frames, so as to appear at the first location and the second location, respectively, when viewed by a user of the electronic device.

In one or more implementations, the electronic device may also generate third content with a third application running on the electronic device, generate a third rendering of the third content with the system renderer, and provide the third rendering to the compositor with the first rendering and the second rendering. The electronic device may also update, with the compositor, the display environment to concurrently include the first rendering at the first location in the display environment, the second rendering at the second location in the display environment, and the third rendering at a third location in the display environment.

In one or more implementations, the first rendering is a first three-dimensional rendering. In one or more implementations, the second rendering is a second three-dimensional rendering. In one or more implementations, generating the display environment includes generating a three-dimensional display environment that concurrently includes the first three-dimensional rendering at a first three-dimensional location in the three-dimensional display environment and the second three-dimensional rendering at a second three-dimensional location in the three-dimensional display environment (e.g., as described above in connection with FIG. 6). In one or more implementations, the display environment may be overlayed on a view of a physical environment (e.g., to generate an XR environment, as described herein). In one or more implementations, the display environment may be arranged to prevent (e.g., block) a view of a physical environment.

Figure 9:
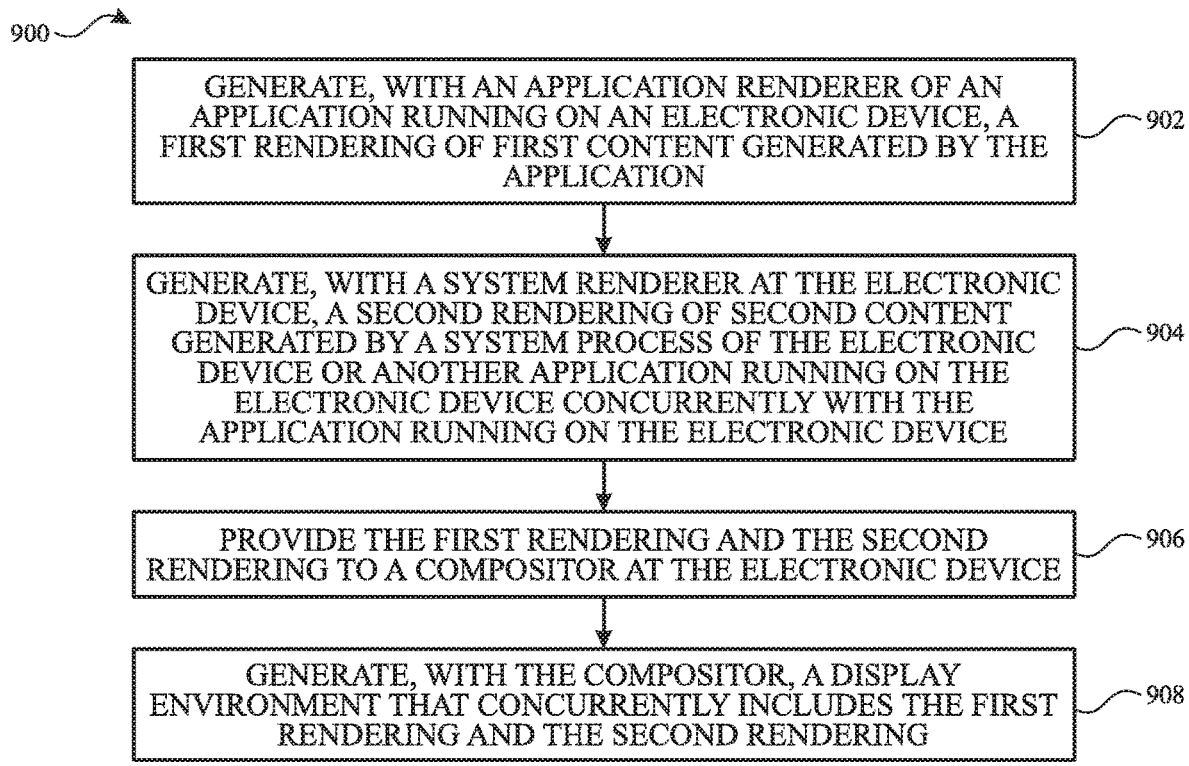
FIG. 9 illustrates a flow diagram of another example process for operating an electronic device having parallel renderers according to aspects of the subject technology.

FIG. 9 illustrates a flow diagram of another example process for operating an electronic device having parallel renderers according to aspects of the subject technology. The blocks of process 900 are described herein as occurring in serial, or linearly. However, multiple blocks of process 900 may occur in parallel. In addition, the blocks of process 900 need not be performed in the order shown and/or one or more blocks of process 900 need not be performed and/or can be replaced by other operations.

In the example of FIG. 9, at block 902, an application renderer (e.g., application renderer 304) of an application (e.g., application 300) running on an electronic device (e.g., electronic device 105) may generate a first rendering of first content generated by the application. As an example, the first rendering may include a rendered a user interface (e.g., user interface 624) of the application.

At block 904, a system renderer (e.g., system renderer 223) at the electronic device may generate a second rendering of second content generated by a system process (e.g., system process 204) of the electronic device or another application (e.g., application 202) running on the electronic device concurrently with the application (e.g., application 300) running on the electronic device. In one or more implementations, the second content is generated by the other application (e.g., application 202) running on the electronic device concurrently with the application (e.g., application 300) running on the electronic device. The application and the other application may be separate applications. For example, the application and the other application may have been separately launched at the electronic device, such as by a common system launcher (e.g., launcher 400) at the electronic device.

For example, in one or more implementations, prior to generation of the first content by the application and the second content by the other application, the electronic device may launch the application with a system launcher (e.g., launcher 400) of the electronic device, and may also launch the other application with the system launcher of the electronic device. In one or more implementations, launching the application with the system launcher provides access to the compositor by the application. For example, in a use case in which an application were to be launched separately from the system launcher, the application may be prevented from accessing the compositor. For example, in one or more implementations, upon launch by the system launcher, the system launcher may provide access information for accessing the compositor, to the application.

At block 906, the first rendering and the second rendering may be provided (e.g., from the application renderer and the system renderer, respectively) to a compositor (e.g., compositor 302) at the electronic device (e.g., as described herein in connection with FIGS. 3, 4, and/or 5).

At block 908, the compositor may generate a display environment that concurrently includes the first rendering and the second rendering. For example, the display environment may be generated by displaying a series of display frames that each include the first rendering and the second rendering, at respective positions in the display frames, so as to appear at the first location and the second location, respectively, when viewed by a user of the electronic device. In one or more implementations, the display environment may be overlayed on a view of a physical environment (e.g., to generate an XR environment, as described herein). In one or more implementations, the display environment may be arranged to prevent (e.g., block) a view of a physical environment.

In one or more implementations, the first rendering is a first three-dimensional rendering, the second rendering is a second three-dimensional rendering, and generating the display environment includes generating a three-dimensional display environment that concurrently includes the first three-dimensional rendering at a first three-dimensional location in the three-dimensional display environment and the second three-dimensional rendering at a second three-dimensional location in the three-dimensional display environment (e.g., as described above in connection with FIG. 6).

Figure 10:
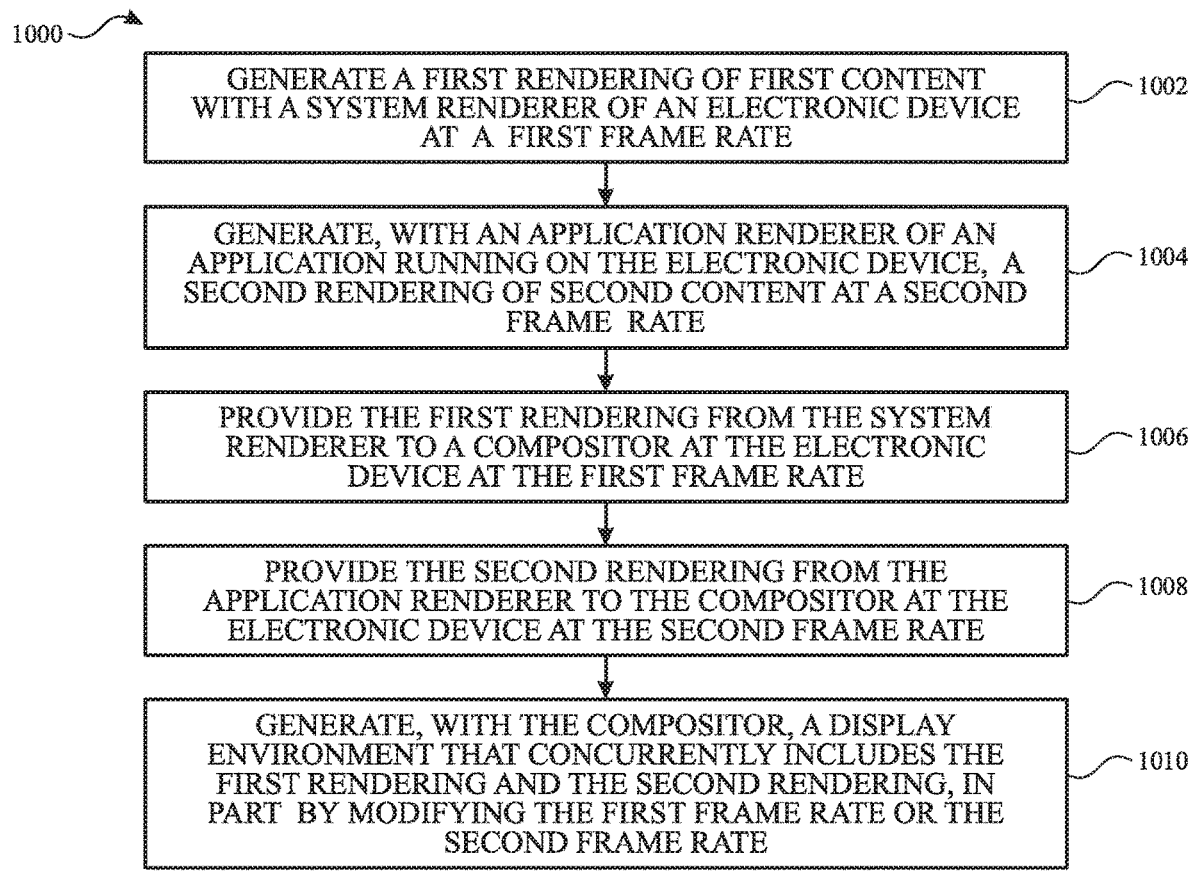
FIG. 10 illustrates a flow diagram of another example process for operating an electronic device having parallel renderers according to aspects of the subject technology.

FIG. 10 illustrates a flow diagram of another example process for operating an electronic device having parallel renderers according to aspects of the subject technology. The blocks of process 1000 are described herein as occurring in serial, or linearly. However, multiple blocks of process 1000 may occur in parallel. In addition, the blocks of process 1000 need not be performed in the order shown and/or one or more blocks of process 1000 need not be performed and/or can be replaced by other operations.

In the example of FIG. 10, at block 1002, a system renderer of an electronic device may generate a first rendering of first content at a first frame rate. For example, in one or more implementations, the first frame rate may correspond to a current display frame rate for a display of the electronic device.

At block 1004, an application renderer of an application running on the electronic device may generate a second rendering of second content at a second frame rate. The first frame rate may be the same as the second frame rate or different from the second frame rate. As an example, the second rendering may include a rendered a user interface (e.g., user interface 624) of the application.

At block 1006, the first rendering may be provided from the system renderer to a compositor (e.g., compositor 302) at the electronic device at the first frame rate. For example, the system renderer may provide the first rendering directly to the compositor, and may provide updates to the first rendering at the first frame rate.

At block 1008, the second rendering may be provided from the application renderer to the compositor at the electronic device at the second frame rate. For example, the application renderer may provide the second rendering directly to the compositor (e.g., without any action with respect to the second rendering by the system renderer) and may provide updates to the second rendering at the second frame rate.

At block 1010, the compositor may generate a display environment that concurrently includes the first rendering and the second rendering, in part by modifying the first frame rate or the second frame rate. For example, the compositor may modify reduce a higher of the first frame rate or the second frame rate to the lower of the first frame rate or the second frame rate, or may otherwise modify one or both of the first frame rate and the second frame rate to match the first frame rate and the second frame rate. As another example, the electronic device may identify, using a sensor of the electronic device, an intent of a user of the electronic device, and modify the first frame rate or the second frame rate based on the intent, in one or more implementations.

For example, in one or more use cases, identifying the intent may include identifying, using the sensor, a user action with respect to the first rendering in the display environment, and modifying the first frame rate or the second frame rate based on the identified intent may include reducing the second frame rate. For example, the user action may include a user gesture associated with the first rendering in the display environment. In another example, the user action may include a user gaze at a location corresponding to the first rendering in the display environment.

In one or more other use cases, identifying the intent may include identifying, using the sensor, a user action with respect to the second rendering in the display environment, and modifying the first frame rate or the second frame rate based on the identified intent may include reducing the first frame rate. For example, the user action may include a user gesture with respect to the second rendering in the display environment. In another example, the user action may include a user gaze at a location corresponding to the second rendering in the display environment.

In one or more implementations, the first rendering may be a first three-dimensional rendering, the second rendering may be a second three-dimensional rendering, and generating the display environment may include generating a three-dimensional display environment that concurrently includes the first three-dimensional rendering at a first three-dimensional location in the three-dimensional display environment and the second three-dimensional rendering at a second three-dimensional location in the three-dimensional display environment (e.g., as described above in connection with FIG. 6).

Figure 11:
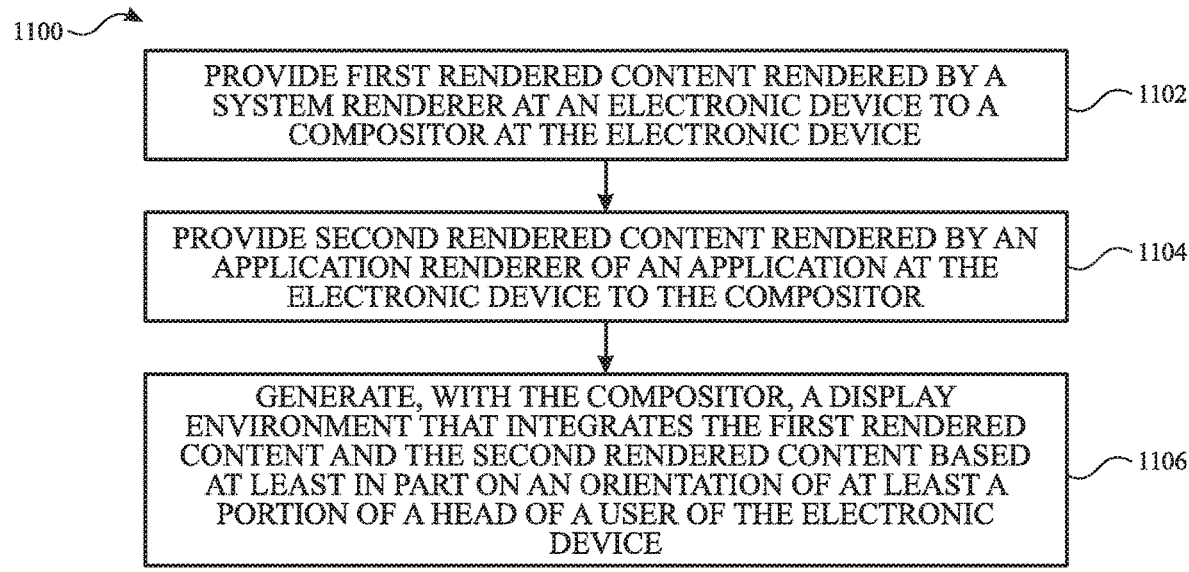
FIG. 11 illustrates a flow diagram of another example process for operating an electronic device having parallel renderers according to aspects of the subject technology.

FIG. 11 illustrates a flow diagram of another example process for operating an electronic device having parallel renderers according to aspects of the subject technology. The blocks of process 1100 are described herein as occurring in serial, or linearly. However, multiple blocks of process 1100 may occur in parallel. In addition, the blocks of process 1100 need not be performed in the order shown and/or one or more blocks of process 1100 need not be performed and/or can be replaced by other operations.

In the example of FIG. 11, at block 1102, a system renderer (e.g., system renderer 223) at an electronic device (e.g., electronic device 105) may provide first rendered content, rendered by the system renderer, to a compositor (e.g., compositor 302) at the electronic device. The first rendered content may be generated by a system process (e.g., system process 204) and/or by an application (e.g., application 202) running on the electronic device.

At block 1104, an application renderer (e.g., application renderer 304) of an application (e.g., application 300) at the electronic device may provide second rendered content, rendered by the application renderer, to the compositor. The second rendered content may be obtained and/or generated by the application, and rendered by the application renderer of the application. As an example, the second rendered content may include a rendered a user interface (e.g., user interface 624) of the application.

At block 1106, the compositor may generate a display environment that integrates the first rendered content and the second rendered content based at least in part on an orientation of at least a portion of a head of a user of the electronic device. For example, the orientation of at least the portion of the head of the user may include an orientation (e.g., an elevation angle, an azimuth angle, and/or a tilt angle) of the head of the user (e.g., as determined using one or more inertial sensors of the electronic device). As another example, the orientation of at least the portion of the head of the user may include an orientation of a gaze of the user.

In one or more implementations, generating the display environment may include identifying a portion of the first rendered content and a portion of the second rendered content for display based on the orientation. For example, the electronic device may determine that a user's head is oriented downward in a direction that results in top portions of the first rendered content and the second rendered content being cut off from the user's field of view, and the compositor may cause remaining bottom portions of the first rendered content and the second rendered content to be included (e.g., at the top of the display) in the display frames output by the compositor. In one or more implementations, generating the display environment may include modifying a display characteristic of the first rendered content or the second rendered content for display based on the orientation. As examples, the display characteristic may include at least one of a frame rate or a resolution.

For example, the electronic device may determine that the user's gaze is oriented toward the first rendered content, and the compositor may, responsively, slow the frame rate and/or reduce the resolution of the second rendered content (e.g., to save power and/or computing resources for displaying the second rendered content while the user's gaze is oriented away from the second rendered content). In an example use case, the electronic device may later determine that the user's gaze has moved away from the first rendered content toward the second rendered content and, responsively, the compositor may increase the frame rate and/or resolution of the second rendered content (e.g., and reduce the frame rate and/or resolution of the first rendered content).

In one or more implementations, the electronic device may receive a user selection of the first rendered content or the second rendered content in the display environment, and with the compositor, expand the user selected first rendered content or second rendered content to entirely occupy the display environment (e.g., as described above in connection with FIG. 7). The user selection may be received responsive to a user touching or tapping a portion of a display on which the first rendered content or the second rendered content is displayed, to a user making a gesture at, toward, and/or near the location at which the first rendered content or the second rendered content is displayed or appears to be displayed, and/or to a user orientating their gaze on the displayed first rendered content or second rendered content (as examples).

In one or more implementations, expanding the user selected first rendered content or second rendered content to entirely occupy the display environment may include continuing to receive the unselected one of the first rendered content or second rendered content and ceasing include the received unselected one of the first rendered content or second rendered content in the display environment. In one or more implementations, expanding the user selected first rendered content or second rendered content to entirely occupy the display environment may also include increasing the size of, and centering the location of, the selected one of the first rendered content or second rendered content so that the size of the selected one of the first rendered content or second rendered content fills the display area of the display.

As described above, aspects of the subject technology may include the collection and transfer of data from an application to other users' computing devices. The present disclosure contemplates that in some instances, this collected data may include personal information data that uniquely identifies or can be used to identify a specific person. Such personal information data can include gaze information, head position and/or characteristic information, motion information, environment information, demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used in a compositing rendered display information from multiple renderers. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of compositing rendered display information from multiple renderers, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 12:
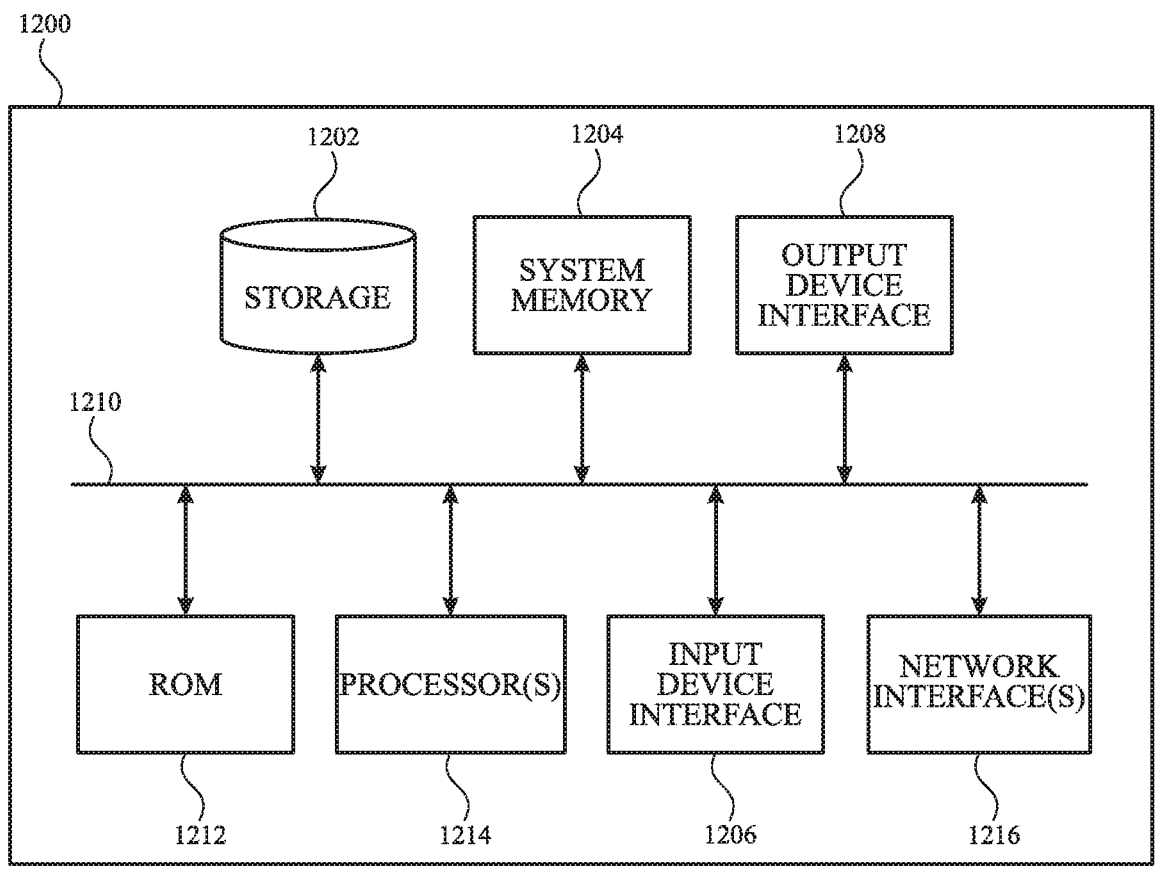
FIG. 12 illustrates an example computing device with which aspects of the subject technology may be implemented.

FIG. 12 illustrates an example computing device with which aspects of the subject technology may be implemented in accordance with one or more implementations. The computing device 1200 can be, and/or can be a part of, any computing device or server for generating the features and processes described above, including but not limited to a laptop computer, a smartphone, a tablet device, a wearable device such as a goggles or glasses, and the like. The computing device 1200 may include various types of computer readable media and interfaces for various other types of computer readable media. The computing device 1200 includes a permanent storage device 1202, a system memory 1204 (and/or buffer), an input device interface 1206, an output device interface 1208, a bus 1210, a ROM 1212, one or more processing unit(s) 1214, one or more network interface(s) 1216, and/or subsets and variations thereof.

The bus 1210 collectively represents all system, peripheral, and chipset buses that communicatively connect the numerous internal devices of the computing device 1200. In one or more implementations, the bus 1210 communicatively connects the one or more processing unit(s) 1214 with the ROM 1212, the system memory 1204, and the permanent storage device 1202. From these various memory units, the one or more processing unit(s) 1214 retrieves instructions to execute and data to process in order to execute the processes of the subject disclosure. The one or more processing unit(s) 1214 can be a single processor or a multi-core processor in different implementations.

The ROM 1212 stores static data and instructions that are needed by the one or more processing unit(s) 1214 and other modules of the computing device 1200. The permanent storage device 1202, on the other hand, may be a read-and-write memory device. The permanent storage device 1202 may be a non-volatile memory unit that stores instructions and data even when the computing device 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1214 may need at runtime. In one or more implementations, the processes of the subject disclosure are stored in the system memory 1204, the permanent storage device 1202, and/or the ROM 1212. From these various memory units, the one or more processing unit(s) 1214 retrieves instructions to execute and data to process in order to execute the processes of one or more implementations.

The bus 1210 also connects to the input and output device interfaces 1206 and 1208. The input device interface 1206 enables a user to communicate information and select commands to the computing device 1200. Input devices that may be used with the input device interface 1206 may include, for example, alphanumeric keyboards and pointing devices (also called "cursor control devices"). The output device interface 1208 may enable, for example, the display of images generated by computing device 1200. Output devices that may be used with the output device interface 1208 may include, for example, printers and display devices, such as a liquid crystal display (LCD), a light emitting diode (LED) display, an organic light emitting diode (OLED)

display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1210 also couples the computing device 1200 to one or more networks and/or to one or more network nodes through the one or more network interface(s) 1216. In this manner, the computing device 1200 can be a part of a network of computers (such as a LAN, a wide area network ("WAN"), or an Intranet, or a network of networks, such as the Internet. Any or all components of the computing device 1200 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   generating a first rendering of first content with a system renderer at an electronic device;
   generating, with an application renderer of an application running on the electronic device, a second rendering of second content;
   providing the first rendering and the second rendering to a compositor at the electronic device, wherein the compositor is separate from the system renderer and separate from the application renderer;
   determining, by the compositor, a first location for the first rendering and a second location for the second rendering in a display environment;
   modifying, by the compositor, the first location for the first rendering or the second location for the second rendering in the display environment; and
   generating, with the compositor, the display environment that concurrently includes the first rendering at the first location in the display environment and the second rendering at the second location in the display environment.

2. The method of claim 1, wherein the first rendering is a first three-dimensional rendering, wherein the second rendering is a second three-dimensional rendering, wherein the first location comprises a first three-dimensional location, wherein the second location comprises a second three-dimensional location, and wherein generating the display environment comprises generating a three-dimensional display environment that concurrently includes the first three-dimensional rendering at the first three-dimensional location in the three-dimensional display environment and the second three-dimensional rendering at the second three-dimensional location in the three-dimensional display environment.

3. The method of claim 1, further comprising:
   providing the first content from a first process at the electronic device to the system renderer at the electronic device; and
   generating the second content with the application.

4. The method of claim 3, wherein the first process is a system process of the electronic device.

5. The method of claim 3, wherein the first process is another application running on the electronic device.

6. The method of claim 5, wherein the application is a first application and the other application is a second application, the method further comprising:
   generating third content with a third application running on the electronic device;
   generating a third rendering of the third content with the system renderer;
   providing the third rendering to the compositor with the first rendering and the second rendering; and
   updating, with the compositor, the display environment to concurrently include the first rendering at the first location in the display environment, the second rendering at the second location in the display environment, and the third rendering at a third location in the display environment.

7. The method of claim 3, wherein generating the second rendering of the second content comprises generating the second rendering with the application renderer concurrently with generating the first rendering of the first content with the system renderer.

8. The method of claim 1, wherein providing the first rendering and the second rendering to the compositor comprises providing the second rendering directly from the application to the compositor.

9. The method of claim 1, wherein the display environment is overlayed on a view of a physical environment.

10. The method of claim 1, wherein the display environment is arranged to prevent a view of a physical environment.

11. The method of claim 1, wherein the modification of the first location or the second location is based at least in part on scene content provided to the compositor, wherein the scene content includes content other than the first rendering and the second rendering.

12. A method, comprising:
   generating, with an application renderer of an application running on an electronic device, a first rendering of first content generated by the application;

generating, with a system renderer at the electronic device, a second rendering of second content generated by a system process of the electronic device or another application running on the electronic device concurrently with the application running on the electronic device;

providing the first rendering and the second rendering to a compositor at the electronic device, wherein the compositor receives the first rendering as application rendered content, wherein the compositor receives the second rendering as system rendered content, the compositor being logically interposed between the application renderer and a display of the electronic device and logically interposed between the system renderer and the display;

determining, by the compositor, a first location for the first rendering and a second location for the second rendering in a display environment;

modifying, by the compositor, the first location for the first rendering or the second location for the second rendering in the display environment; and generating, with the compositor, the display environment that concurrently includes the first rendering and the second rendering, wherein the display environment is provided to the display.

13. The method of claim 12, wherein the second content is generated by the other application running on the electronic device concurrently with the application running on the electronic device.

14. The method of claim 13, further comprising, prior to generation of the first content by the application and the second content by the other application:
launching the application with a system launcher of the electronic device; and
launching the other application with the system launcher of the electronic device.

15. The method of claim 12, wherein the first rendering is a first three-dimensional rendering, wherein the second rendering is a second three-dimensional rendering, wherein the first location for the first rendering and the second location for the second rendering comprises a first three-dimensional location and a second three-dimensional location, and wherein generating the display environment comprises generating a three-dimensional display environment that concurrently includes the first three-dimensional rendering at the first three-dimensional location in the three-dimensional display environment and the second three-dimensional rendering at the second three-dimensional location in the three-dimensional display environment.

16. The method of claim 12, further comprising:
providing access information corresponding to the first rendering to the compositor at the electronic device, wherein the access information indicates to the compositor that the application is authorized to generate the first rendering, and wherein the application and the other application are separate applications.

17. A method, comprising:
generating a first rendering of first content with a system renderer of an electronic device at a first frame rate;
generating, with an application renderer of an application running on the electronic device, a second rendering of second content at a second frame rate;
providing the first rendering from the system renderer to a compositor at the electronic device at the first frame rate;

providing the second rendering from the application renderer to the compositor at the electronic device at the second frame rate;

determining, by the compositor, a first location for the first rendering and a second location for the second rendering in a display environment;

modifying, by the compositor, the first location for the first rendering or the second location for the second rendering in the display environment; and generating, with the compositor, the display environment that concurrently includes the first rendering and the second rendering, in part by modifying, with the compositor, the first frame rate or the second frame rate.

18. The method of claim 17, further comprising:
identifying, using a sensor of the electronic device, an intent of a user of the electronic device; and
modifying the first frame rate or the second frame rate based on the intent.

19. The method of claim 18, wherein identifying the intent comprises identifying, using the sensor, a user action with respect to the first rendering in the display environment, and wherein modifying the first frame rate or the second frame rate based on the identified intent comprises reducing the second frame rate.

20. The method of claim 19, wherein the user action comprises a user gesture associated with the first rendering in the display environment.

21. The method of claim 19, wherein the user action comprises a user gaze at the first location corresponding to the first rendering in the display environment.

22. The method of claim 18, wherein identifying the intent comprises identifying, using the sensor, a user action with respect to the second rendering in the display environment, and wherein modifying the first frame rate or the second frame rate based on the identified intent comprises reducing the first frame rate.

23. The method of claim 22, wherein the user action comprises a user gesture with respect to the second rendering in the display environment.

24. The method of claim 22, wherein the user action comprises a user gaze at the second location corresponding to the second rendering in the display environment.

25. The method of claim 17, wherein the first rendering is a first three-dimensional rendering, wherein the second rendering is a second three-dimensional rendering, wherein the first location for the first rendering and the second location for the second rendering comprises a first three-dimensional location and a second three-dimensional location, and wherein generating the display environment comprises generating a three-dimensional display environment that concurrently includes the first three-dimensional rendering at the first three-dimensional location in the three-dimensional display environment and the second three-dimensional rendering at the second three-dimensional location in the three-dimensional display environment.

26. The method of claim 17, wherein the compositor is separate from the system renderer and separate from the application renderer, and wherein the compositor is disposed closer to the display environment than the system renderer and the application renderer.

27. A method, comprising:
providing first rendered content rendered by a system renderer at an electronic device to a compositor at the electronic device;
providing second rendered content rendered by an application renderer of an application at the electronic device to the compositor;

determining, by the compositor, a first location for the first rendered content and a second location for the second rendered content in a display environment;

modifying, by the compositor, the first location for the first rendered content or the second location for the second rendered content in the display environment; and generating, with the compositor, the display environment that integrates the first rendered content and the second rendered content based at least in part on an orientation of at least a portion of a head of a user of the electronic device, wherein the integration of the first rendered content and the second rendered content includes, modifying, by the compositor, the first rendered content or the second rendered content by modifying a first frame rate or a first resolution of the first rendered content or a second frame rate or a second resolution of the second rendered content, the compositor providing the generated display environment to a display of the electronic device.

28. The method of claim 27, wherein the orientation of at least the portion of the head of the user comprises an orientation of the head of the user.

29. The method of claim 27, wherein the orientation of at least the portion of the head of the user comprises an orientation of a gaze of the user.

30. The method of claim 27, wherein generating the display environment comprises identifying a portion of the first rendered content and a portion of the second rendered content for display based on the orientation.

31. The method of claim 27, further comprising:

receiving, by the electronic device, a user selection of the first rendered content or the second rendered content in the display environment; and with the compositor, expanding the user selected first rendered content or second rendered content to entirely occupy the display environment.

32. The method of claim 27, wherein the compositor is separate from the system renderer, wherein the compositor is separate from the application renderer, and wherein the compositor is disposed closer to the display environment than the system renderer and the application renderer.

* * * * *